United States Patent [19]

Sharma

[11] Patent Number: 4,522,833

[45] Date of Patent: Jun. 11, 1985

[54] ROASTED COATED NUT PRODUCT AND PROCESS THEREFOR

[75] Inventor: Shri C. Sharma, Mendham, N.J.

[73] Assignee: Warner-Lambert Company, Morris Plains, N.J.

[21] Appl. No.: 570,476

[22] Filed: Jan. 13, 1984

[51] Int. Cl.³ ............................................. A23L 1/36
[52] U.S. Cl. ...................................... 426/93; 426/303; 426/304; 426/307; 426/305; 426/309; 426/629
[58] Field of Search ................ 426/93, 309, 629, 304, 426/305, 303, 307

[56] References Cited

U.S. PATENT DOCUMENTS 3,876,811  4/1975  Bonner et al. ......................... 426/93
3,959,498  5/1976  Lyall et al. ............................ 426/93
4,161,545  7/1979  Green .................................... 426/93

FOREIGN PATENT DOCUMENTS 2705718  8/1978  Fed. Rep. of Germany ........ 426/93

Primary Examiner—Jeanette Hunter
Attorney, Agent, or Firm—Gary M. Nath; Marian F. Kadlubowski

[57] ABSTRACT

A process for applying a coating to an edible nut which comprises partially roasting the nut until the onset of flavor development, coating the nut with a sugar syrup containing slurry, subjecting the coated nut to a final roasting process until full flavor development, cooling the coated nut and recovering the product. The preferred sugar syrup is honey.

18 Claims, 3 Drawing Figures

PRIOR ART FLOW DIAGRAM

ROASTED COATED NUT PRODUCT AND PROCESS THEREFOR

BACKGROUND OF THE INVENTION

It is common practice to enhance or vary the flavor of nuts by coating the nuts with a confection. Illustrative of the prior art coatings are honey, hexitols and other confections, incorporating into the coating, rice or wheat flour.

U.S. Pat. No. 3,671,266 discloses a process for coating nuts which comprises wetting the nuts with water or a sorbitol solution, dusting the wet nuts with comminuted mannitol and roasting the treated nuts.

U.S. Pat. No. 4,053,650 discloses a method for preparing a baked confection which comprises alternately coating a nut with an aqueous viscous solution, a leavening agent and an edible flour, e.g., rice or wheat flour. The aqueous viscous solution may be corn syrup, a sugar solution, a gum solution or a dextrin solution.

U.S. Pat. No. 3,740,236 discloses a method for reconstituting partially defatted nuts and coating the reconstituted product with a dry powdered coating of salt, monosodium glutamate, yeast extract, starch, dextrin, herbs and spices.

More recently a method has been disclosed in U.S. Pat. No. 4,165,545 for the coating of nuts with a honey based material. FIG. I is an illustrative flow diagram of that coating method. Raw nuts are first coated with a mixture of honey and water. The honey coated nuts are then enrobed with a dry mixture of sugar and starch, and roasted. After the nuts are cooled an additional sugar coating is applied before packaging.

These prior art methods fail to produce an ideal product for various reasons. Where the coating is put on the nut prior to roasting the coating is degraded by the roasting process and the degraded coating is "flaked off" by the pressure of volatiles released from nuts during roasting.

As a result a significant portion of the coating is lost in handling and packaging of the nuts. Additionally, flavoring materials applied with the coating are lost during the roasting process or physically removed with the flaked off coating.

In the case of the honey coated nuts of the prior art, the nuts develop a burnt flavor, as a result of caramelization of sugars during roasting, and part of the honey flavor is lost. Since, as a result, the nuts develop a dark color, it is necessary to cover up this objectional color by applying ground blanched peanuts or other materials as an after-coating. During the roasting process much of the wet coating sticks to process equipment. This creates an undesired loss and creates product of inferior quality. Furthermore, excessive process time is expended in equipment clean up.

What is required is an effective and efficient method of honey coating nuts which avoids the problems of the prior art and results in a nut product with a fresh, distinctive honey flavor.

SUMMARY OF THE INVENTION

It has surprisingly been found that honey coated nuts having a fresh distinctive flavor can be produced by modifying the coating and roasting cycles to avoid over roasting of nuts and burning of the coating. The nuts to be processed are partially roasted at about 143° C. to about 178° C. to reduce the water content to about 2 to $2\frac{1}{2}\%$ and contacted with a honey based, sugar slurry at about 121° C. for a time sufficient to dry the coating into a thin uniform coating. The nuts are subsequently roasted to develop full roasting flavor. After cooling the nuts are dusted with salt. Optionally the nuts may be dusted with other seasonings.

DETAILED DESCRIPTION

This invention relates to a method for preparing a nut confection. In particular, it relates to a method for preparing a nut confection having a honey based coating. Specifically, it relates to an improved process for coating nuts with a honey based composition in a manner which results in a product which has a pleasant appearance and a fresh distinctive honey flavor. To accomplish this result the roasting cycle is modified with incorporation of enrobing as an intermediate step which the honey coating is applied and that the final roasting being completed with nuts covered with honey.

Figure 1:
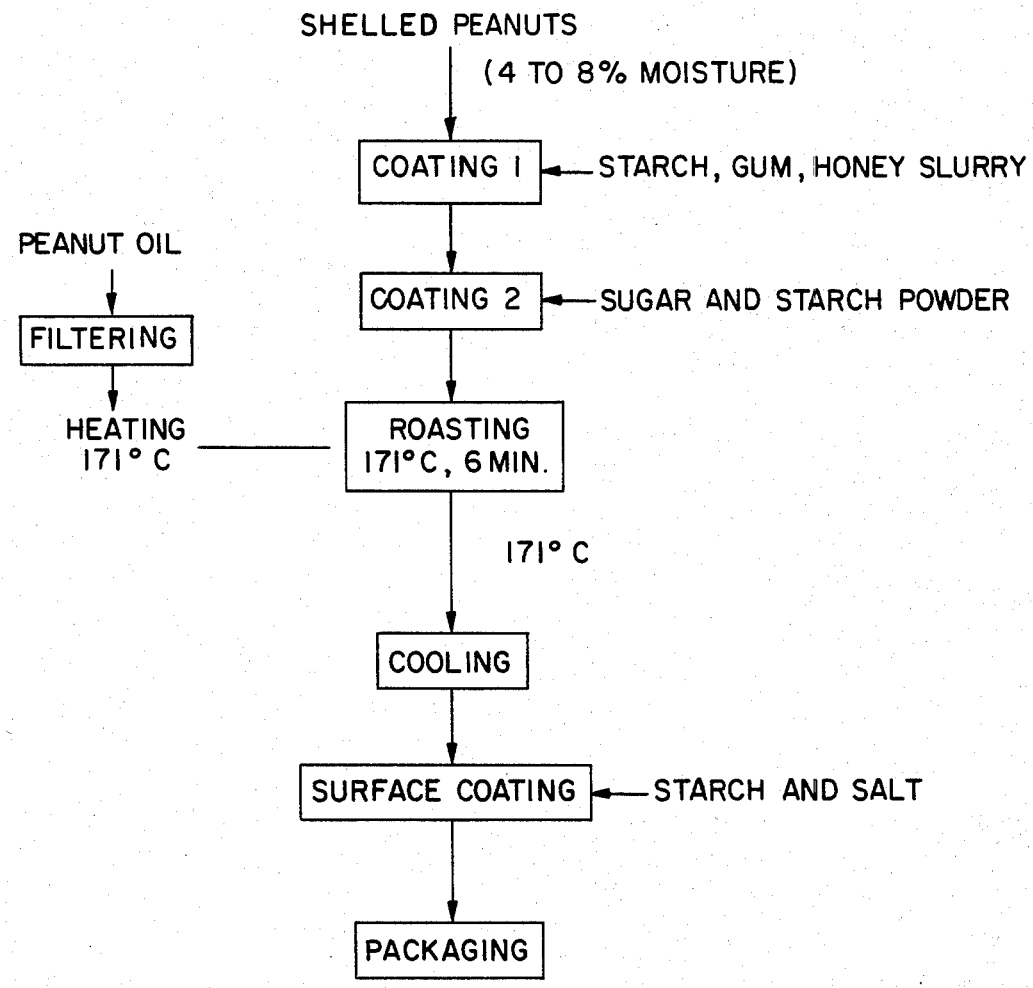
FIG. 1 Prior Art Process Flow Diagram.
Figure 2:
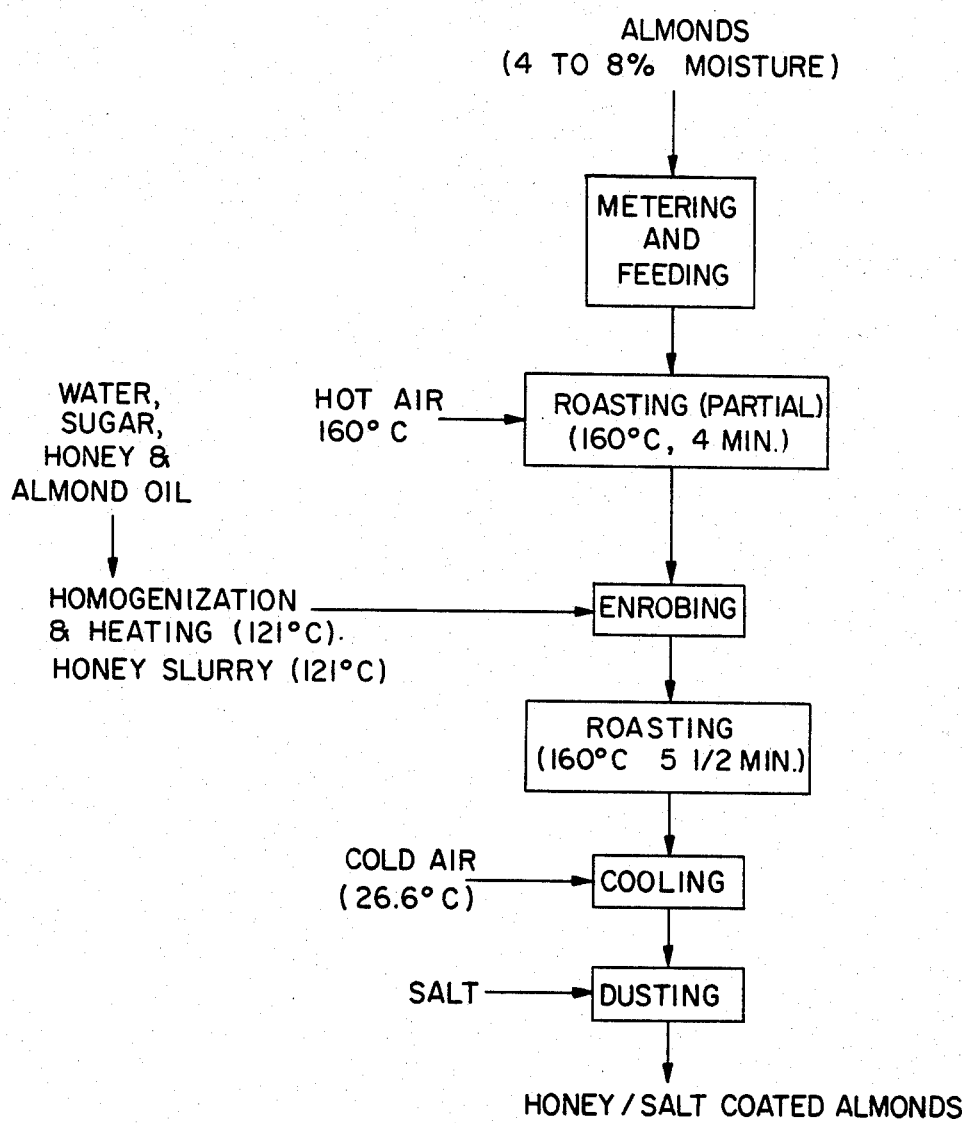
FIG. 2 Process Flow Diagram.
Figure 3:
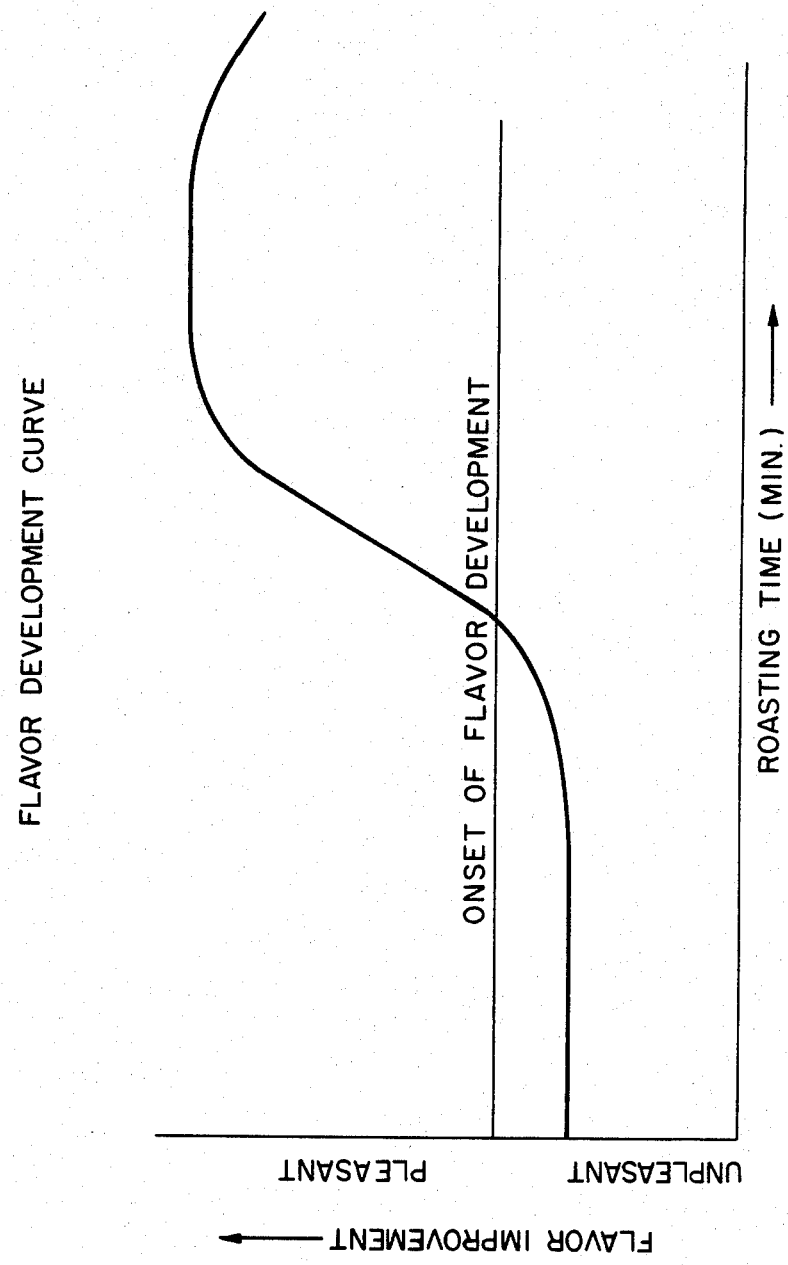
FIG. 3 Roasting Cycle-Flavor Curve.

The process of this invention is illustrated by the flow diagram of FIG. 2. The times and temperatures shown represent the preferred parameters for almonds.

Referring now to FIG. 2, dehydrated almonds which generally have a moisture content of about four to eight percent by weight, are partially roasted at 160° C. in a hot air stream for about four minutes to reduce their moisture content to about 2.0%. These nuts are then enrobed with the honey slurry of this invention at about 121° C. The nuts are subsequently roasted at about 160° C. for about $5\frac{1}{2}$ minutes to achieve full flavor.

The term "flavor onset" as used in the specification and claims means that point in the roasting cycle at which flavor development begins and the nut flavor begins to have a pleasant taste. The flavor-roasting time curve can be readily developed by sampling the nuts during a roasting cycle, tasting and recording the observation as a function of time. Since taste is subjective the point of flavor onset is only approximately located but can be defined by roasting time-roasting temperature parameters. At the point of flavor onset the nut moisture content will be about 1 to $2\frac{1}{2}\%$ by weight based on the total nut weight (w/w). The color of the blanched nut meat will have begun to change from a light color to a brown color. FIG. III illustrates a typical flavor development curve. Flavor development is a chemical reaction and proceeds rapidly at elevated temperature as the moisture content of the nut is reduced.

The term "partial roasting" as used in the specification and claims means roasting until flavor onset is achieved. It is an essential aspect of the invention since as will be seen by reference to FIG. III over-roasting results in deterioration in nut flavor. The term "full flavor development" as used in the specification and claims means that point in the roasting cycle at which flavor development no longer improves with time. It can be determined by a taste test similar to that heretofore described. In order for the nut to have a full flavor, without having a scorched taste, care must be given in the practice of this invention to balance the partial roasting cycle and the final roasting cycle so that over-roasting does not occur. The sum of the partial roasting time and the final roasting time of this invention will, of course, exceed the usual roasting time for the same nut since the nut is cooled somewhat during the enrobing stage, and water must be removed from the honey based slurry.

The partial roasting time will range from about 2½ to about 6 minutes, preferably about 3 to 4½ minutes while the final roasting time cycle will be about 4 to about 11 minutes preferably about 5 to about 10 minutes. The roasting temperature can vary from about 137° C. to about 188° C. At temperatures substantially below 137° C. flavor development does not occur in practical time limits. Above 188° C. the outer portion of the nut will be over-roasted before full flavor development occurs in the center of the nut meat. Preferably, roasting is carried out at a temperature of about 150° C. to about 171° C.

The honey based slurry used in the coating process of this invention comprises honey, granulated sugar, and an oil. Additional flavorings can be incorporated into the slurry.

The honey not only provides taste but serves to bind the coating to the nut. The sugar adds sweetening; while the oil acts as a plasticizer for the coating.

The oil can be any vegetable or nut oil, preferably a hydrogenated vegetable oil, e.g. peanut oil, sunflower oil, corn oil, safflower oil, etc. The preferred oil is almond oil. The term "oil" as used in the specification and claims means an edible vegetable or nut oil, whether or not hydrogenated, but does not include mineral oil.

The honey based slurry of this invention must be viscous enough to adhere well to the nuts, but still be sufficiently fluid to form a thin uniform coating on the nut. The desired rheological characteristics of the slurry are achieved by controlling the water content and the application temperature. The water content should not exceed about 30% (w/w), nor be less than about 15%, preferably the water content of the slurry is about 20 to about 28% (w/w), and more preferably about 23 to about 27% (w/w). In addition to affecting the application of the coating to the nut, excessive water content will adversely affect final product quality. Excessive water will extend both the enrobing time and the final roasting cycle. These extended process times result in softening of the outer surface of the nut thereby causing it to lose its "crunchy" texture. Also, the shelf life of the nuts coated with slurry at higher moisture contents (see U.S. Pat. No. 4,165,545), tend to be hydroscopic and have short shelf life.

The slurry temperature during the enrobing step can be about 98° C. to about 150° C., preferably about 115° C. to 127° C., and more preferably about 118° to about 124° C.

The slurry temperature is preferably about the same as the nut temperature. If the nut temperature is substantially above the slurry temperature the nut will develop thermal checks and cracks and a deterioration in flavor. If the nut temperature is substantially below the slurry temperature it will tend to absorb liquid and lose its "crunchy" character. The nut temperature can differ from that of the slurry temperature by about 10 to about 20° F., preferably about 5° to about 10° F., more preferably the temperature of the slurry and nut are substantially the same. It will be appreciated that there will be a temperature gradient across the nut and the nut temperature referred to with respect to the slurry temperature refers to the outer part of the nut. The nuts will of course cool as much as 15° C. to 35° C. below their roasting temperatures in the process of being transferred to the coating pan.

The honey content of the slurry can be about 2½ to about 10%, preferably about 3 to about 9%, more preferably about 3½ to about 8½% (w/w). At less than 2½% honey, the coating neither has sufficient honey taste, nor adheres well to the nut. At levels of greater than 10% honey, the flow characteristics of the coating are adversely affected. Additionally, sufficient sugar cannot be added to control sweetness.

The granulated sugar content of the slurry can be about 6% (w/w) to about 25% (w/w), preferably about 7% to about 20% (w/w), more preferably about 8 to about 12% (w/w). The granulated sugar content is varied according to taste and to achieve the desired water content ranges for the slurry.

The oil comprises about 2½ to 4½% (w/w) of the slurry, preferably about 3% to 4%. Below to about 2½% oil, the slurry is not sufficiently plasticized for uniform coating. Above about 4½% oil the coating does not adhere well to the nut.

While this invention is described in terms of a honey based slurry, the process of this invention may be advantageously used to apply a slurry of any sugar syrup base. The term "sugar syrup" as used in the specification and claims means natural as well as man made syrups. Honey is the preferred sugar syrup since, the use of other sugar syrups tends to result in crystallization of sugars on the surface of the nut in a manner which is not preferred. Although honey is the preferred sugar syrup, other sugar syrup bases are applied to nuts with advantageous results which cannot be achieved by prior art methods.

Illustrative, non-limiting examples of sugar syrups are, honey, corn syrup, maple syrup, corn starch derived fructose sugar syrup, and so forth. All of these syrups are advantageously utilized in the process of this invention to form coatings on nuts which are uniform, smooth coatings without significant clumping on cooling. The weight ranges discussed for honey can be used for other sugar syrups provided that the overall water content of the slurry, and its other constituents are maintained within the aforementioned limits. Excess water is removed by cooking down the slurry.

The coating slurry is cooked at about 115° C. to about 132° C. until the water content is reduced to the desired range. Its temperature is then adjusted for the particular application by either cooling or additional heating. The term "coating slurry" as used in the specification and claims means the aforedescribed sugar syrup slurries. The weight of coating slurry used based on the nuts plus coating slurry is about 15% to about 30% (w/w), preferably about 20 to about 25% w/w. Below 15% an insufficient coating results. Above 30% the coating is thick and contributes too much sugar syrup flavor thereby masking the natural nut taste.

The process of this invention can be applied to any edible nut, bean or gain. The nuts can be blanched or unblanched and used with or without the skins. Illustrative, non-limiting examples of nuts, beans or grains to which the process of this invention can be applied include almonds, cashews, macadamia, peanuts, pecans, walnuts, soybean, chestnuts, chick peas, corn, rice and barley.

If desired additional coatings and flavorings can be used in the practice of this invention. For example, maple flavoring or molasses can be added to a honey based coating slurry to enhance its flavor. Similarly, natural or artificial flavorings, seasonings and herbs can be added to any of the sugar syrup bases. The term "flavoring" as used in the specification and claims means conventional natural and artificial flavorings, spices, seasonings and herbs. Illustrative, non-limiting examples of flavorings useful in the practice of of this invention include molasses, maple, hickory smoke, cinnamon, nutmeg, allspice, clove, paprika, pepper, salt, thyme, chili, as well as flavor oils such as peppermint, cherry, wintergreen, lime, lemon, and essence fruits such as apricot, orange, and apple. Additionally, artificial flavors such as various esters, and aldehydes, such as cinnamyl acetate, cinnamaldehyde, citral diethyl acetal, dihydrocarvyl acetate, eugenyl, formate, and p-methylanisole. Generally any flavoring such as those described in *Chemicals Used in Food Processing,* pub. 1274 by the National Academy of Sciences, et. al. pages 49–53 and 65–258, may be used.

Additional coatings which may be applied to the coated roasted nut include defatted nut meal, ground nuts such as peanuts, modified food starches, as so forth. The preferred final coating is a dusting of salt.

It will be noted that the process of this invention obviates the need for the addition of gums and other resins or starches to the coating. The advantages of this invention may be more readily appreciated by reference to the following examples. All percents with respect to the slurry are based on total slurry plus nuts by weight, and all weights with reference to the coating are based on the weight of the nut alone.

EXAMPLE I

A homogeneous coating slurry consisting of 44 grams (3.7% w/w) of grade A clover honey, 150 g (12.7% w/w) of granulated surgar (XXX), 40 g (3.4% w/w) of almond oil, 11.25 g (0.9% w/w) of extra fine salt and 40 g (3.4% w/w) of water were cooked at 121° C. with constant stirring for about fifteen minutes until the water content was reduced to about 25% w/w.

Raw, shelled, unblanched almonds (900 g) were subjected to partial roasting at 160° C. for about 3 minutes in a Proctor and Schwartz roaster at a bed depth of 1.5 cm with an air velocity of 14.2 mps. The partially roasted nuts were transferred to a revolving coating pan and blended with the coating slurry until the nuts were uniformly coated.

The coated nuts were returned to the roaster for a final roasting at 160° C. for about 6.75 minutes. The nuts were then cooled under forced air for about 4 minutes until they reached room temperature.

A smooth uniform coating (glazed appearance) was achieved around the nuts with no significant clumping observed during or after cooling. Additionally, there was no loss of coating slurry observed either during or after processing. The nuts had a pleasant honey/roast flavor and exhibited extremely good stability. However, the nuts lacked sufficient salt flavor. This deficiency was overcome by dusting the nuts with salt after cooling. The subsequent examples utilize the procedure of this Example.

EXAMPLE II

Example I was repeated except that the concentration of granulated sugar in the coating slurry was changed to 7.6% from 12.7% and the salt was eliminated. The concentration of honey and almond oil was held constant. After final roasting and cooling, 1.25% of extra fine salt was applied to the nuts. The finished product provided a more intense perception of saltiness and flavor.

EXAMPLE III

Example II was repeated except that the salt dusting was reduced to 0.75% w/w. The nuts still had good flavor and adequate saltiness.

EXAMPLE IV

Example II was repeated except that the honey concentration was increased to 6% and the granulated sugar content was 12%. A good quality product was obtained with enhanced honey flavor.

EXAMPLE V

Example II was repeated except that the coating slurry consisted of 3% honey, 11.2% granulated sugar and 4% almond oil. The coating process was carried out at 245° F. The product had a crunchy nut texture. Not wishing to be bound by theory, it is believed that the change in texture was a result of increased amount of almond oil.

EXAMPLE VI

Example II was repeated except that the coating slurry contained 15% granulated sugar, and the coating temperature was 245° F. The nuts had a pleasant honey roasted flavor.

EXAMPLE VII

Example II was repeated except that the salt dusting comprised 0.68% (w/w) of 6 X sugar and 0.68% (w/w) of extra fine salt. The nuts were found to have excellent taste characteristics which was sweet in nature.

EXAMPLE VIII

Example II was repeated except that immediately before the final roasting step the nuts were dusted with a blend of modified food starch (1%) and 6 X sugar (1%). The nuts had a pleasant flavor with a sweet taste.

EXAMPLE IX

Shelled pecans were coated, in accordance with the method of Example I, with a coating slurry comprising 8.45% honey, 21.25% granulated sugar (XXX) and 3% almond oil. The roasting temperature was 150° C., the partial roasting cycle was 3 minutes and the final roasting cycle was 5 minutes. The product had an extremely desirable honey-roasted pecan flavor and texture.

EXAMPLE X

Example IX was repeated replacing granulated sugar by dark brown sugar. The use of the brown sugar resulted in a perceived enhancement of the honey flavor.

EXAMPLE XI

The method of Example I was used to prepare honey coated cashews. The coating slurry comprised 3% honey, 12% granulated sugar and 2.5% almond oil. The final roasting cycle was extended to 10 minutes and 1.25% of extra fine salt was applied after cooling. The cashews had a delicious honey roasted flavor.

EXAMPLE XII

Example XI was repeated except that U.S. grade No. 1 Medium Runner peanuts were substituted for cashews, the roasting temperature was 340° F. and the final roasting cycle was 8 minutes. The peanuts had a clean fresh honey roasted flavor superior to a similar commercial product.

EXAMPLE XIII

Example XII was repeated except that 1.2% of defatted peanut meal was applied to the coated nut immediately prior to the final roasting. The resulting product had a granular crunchy surface texture of pleasing appearance and a very pleasant flavor. The peanut meal coating did not otherwise affect the product quality.

EXAMPLE XIV

About 450 grams of raw, blanched peanut were coated with about 52 grams of a slurry comprising 2.5%, based on the nuts of a honey having a solids content of 80% (w/w) and 5% based on the nuts of granulated sugar. Prior to coating the slurry was diluted to a 65% solids content. The coated peanuts were roasted at 171° C. for about 8.5 minutes. About 20% to 25% of the total coating was lost in the roaster. Upon cooling to room temperature the nuts caked and clustered together. They were quite hydroscopic.

EXAMPLE XV

Example XIV was repeated using almonds and a roasting temperature of about 160° C. Again 20% to about 25% of the coating was lost and the cooled nuts clustered together.

EXAMPLE XVI

Roasted peanuts were coated with the slurry composition of Example XIV and dried for 1½ minutes using air at about 30° C. The nuts clustered together and were hydroscopic, becoming sticky after about one day at room temperature.

The results of Examples XIV–XVI illustrate the disadvantages of using prior art techniques as compared to the coating method of this invention.

The invention being thus described, it will be obvious that the same may be varied in many ways. Such warranties are not to be regarded as s departure from the spirit or scope of the invention and all such modifications are intended to be included within the scope of the claims.

What is claimed is:

1. A process for producing a flavor enhanced edible nut which comprises:
   (a) partially roasting raw nuts at a temperature of about 137° C. to about 188° C. for about 2.5 minutes to about 6 minutes until the onset of flavor development;
   (b) then coating the partially roasted nuts at a temperature of about 98° C. to about 150° C. with a coating slurry comprising about 2½% to about 10% by weight of a sugar syrup, about 6% to about 25% by weight of sugar and about 2½% to about 4½% by weight of an oil, said coating slurry having a water content of about 15% to about 30% by weight based on the slurry, during which coating time the nuts and slurry are at substantially the same temperature;
   (c) subjecting the coated nuts to a final roasting cycle at a temperature of about 137° C. to about 188° C. for about 4 minutes to about 11 minutes until full flavor development occurs;
   (d) cooling the coated nuts to about room temperature; and
   (e) recovering the nut product.

2. The process according to claim 1 wherein the nuts are dusted with salt after being cooled.

3. The process according to claim 1 wherein the sugar syrup is honey.

4. The process according to claim 1 wherein the oil is almond oil.

5. The process according to claim 1 wherein the partial roasting is carried out at a temperature of about 150° C. to about 171° C. for about 3 to about 4.5 minutes.

6. The process according to claim 1 wherein the final roasting cycle is carried out at about 150° C. to about 171° C. for about 5 to about 10 minutes.

7. The process according to claim 1 wherein the partially roasted nuts are coated with a coating slurry at a coating temperature of about 115° C. to about 127° C.

8. The process according to claim 1 wherein the coating temperature is about 118° C. to about 124° C.

9. The process according to claim 1 wherein the water content of the coating slurry is about 20% to about 28%.

10. The process according to claim 1 wherein the edible nut is almond, cashew, pecan, walnut, macadamia, peanuts, soybean, chick peas, rice, corn or barley.

11. The coated nut product prepared by the process of claim 1.

12. The process according to claim 1 wherein the coating slurry comprises about 3.7% to about 6% by weight of honey, about 8% to about 15% by weight of granulated sugar and about 3% to about 4% by weight of almond oil.

13. The process according to claim 10 wherein the sugar is granulated sugar or brown sugar.

14. The process according to claim 1 wherein the coated nut is further coated with a defatted nut meal immediately prior to the final roasting.

15. The process according to claim 1 wherein a flavoring is added to the coating slurry.

16. The process according to claim 1 wherein a powdered flavoring is dusted on the cooled nuts.

17. The process of claim 1 wherein the slurry temperature during coating is less than 10° to 20° F. different from the temperature of the nuts.

18. The process of claim 1 wherein the slurry temperature during coating is less than 5° to 10° F. different from the temperature of the nuts.

* * * * *